Figures 1, 2:
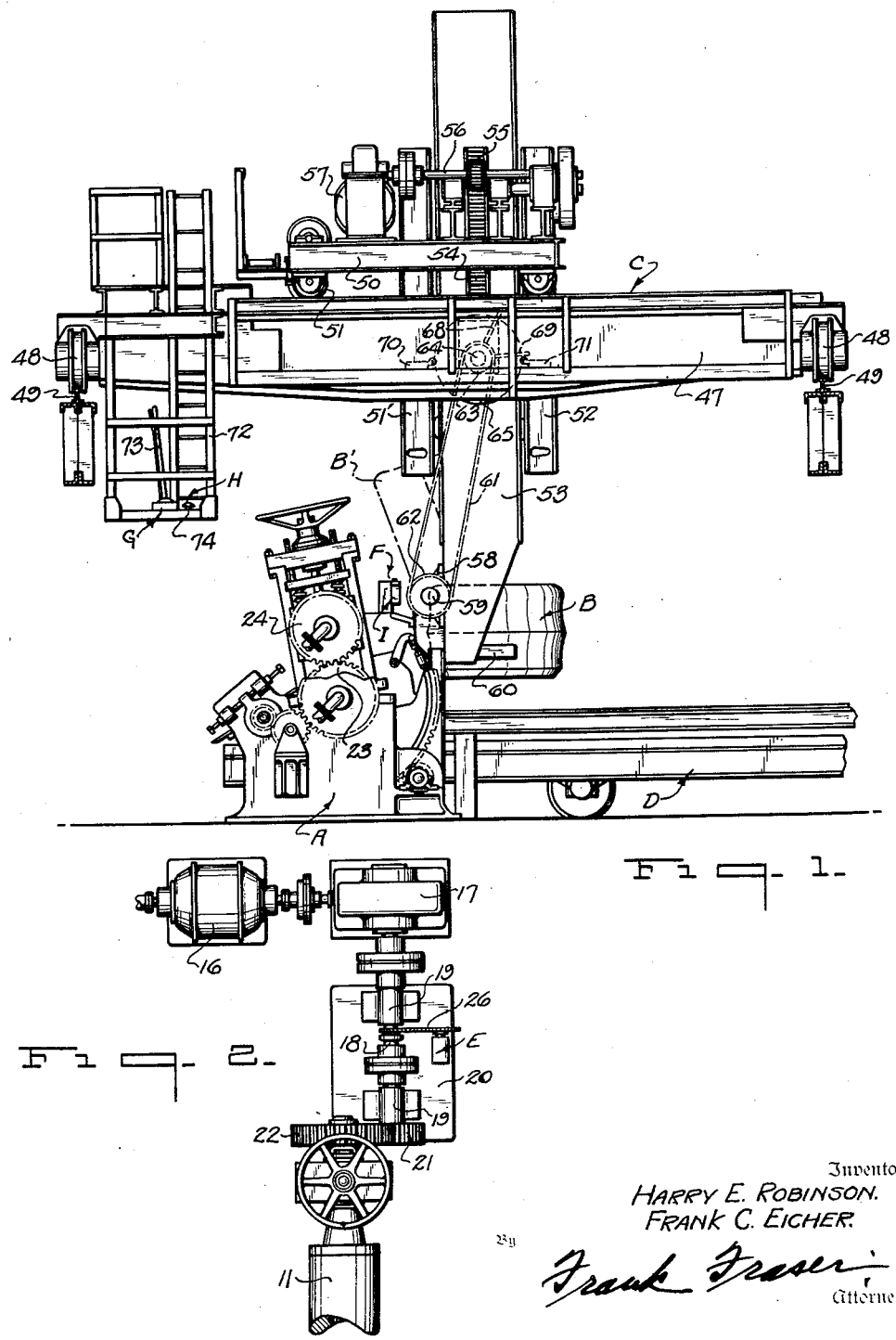

May 25, 1937. H. E. ROBINSON ET AL 2,081,769
METHOD AND APPARATUS FOR HANDLING AND EMPTYING GLASS MELTING POTS
Filed May 4, 1934 5 Sheets-Sheet 1

Inventor
HARRY E. ROBINSON.
FRANK C. EICHER.
By Frank Fraser
Attorney

May 25, 1937.  H. E. ROBINSON ET AL  2,081,769
METHOD AND APPARATUS FOR HANDLING AND EMPTYING GLASS MELTING POTS
Filed May 4, 1934   5 Sheets-Sheet 2
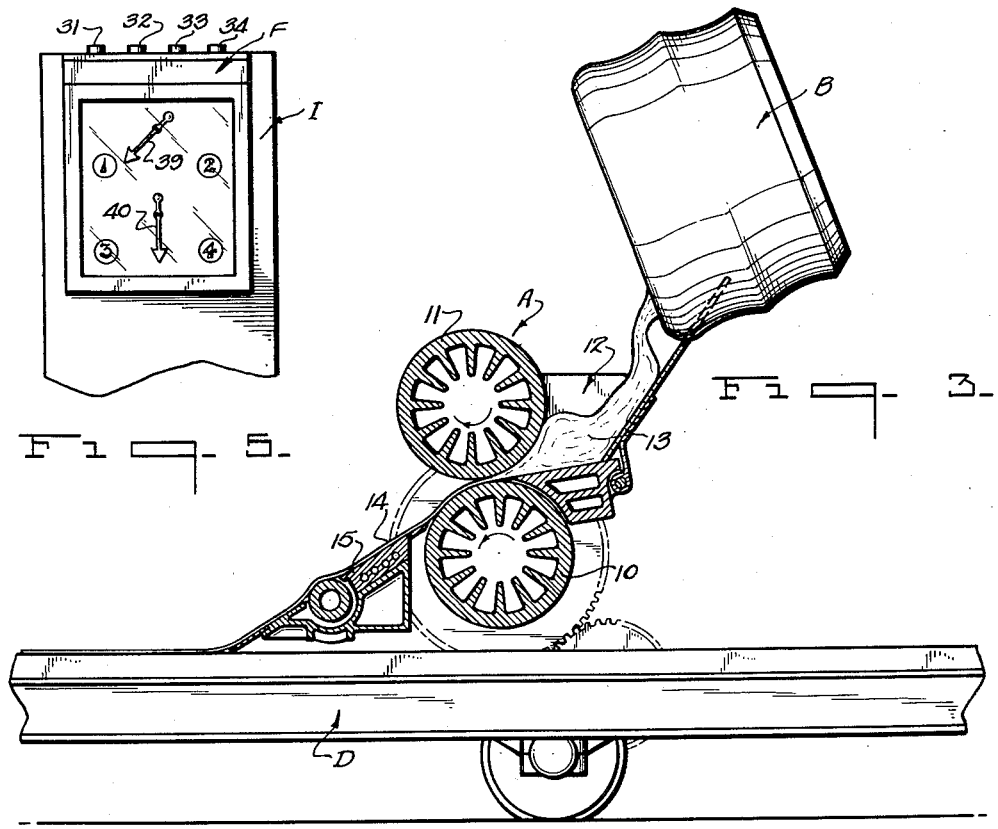
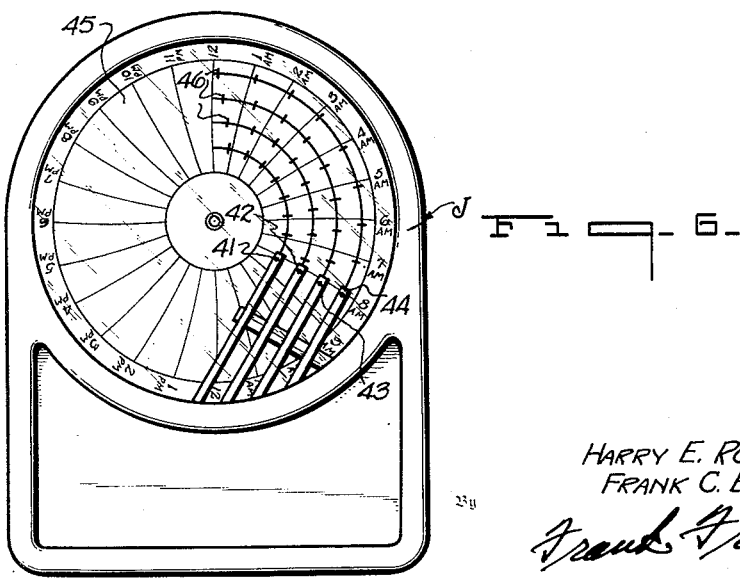
Inventor
HARRY E. ROBINSON.
FRANK C. EICHER.

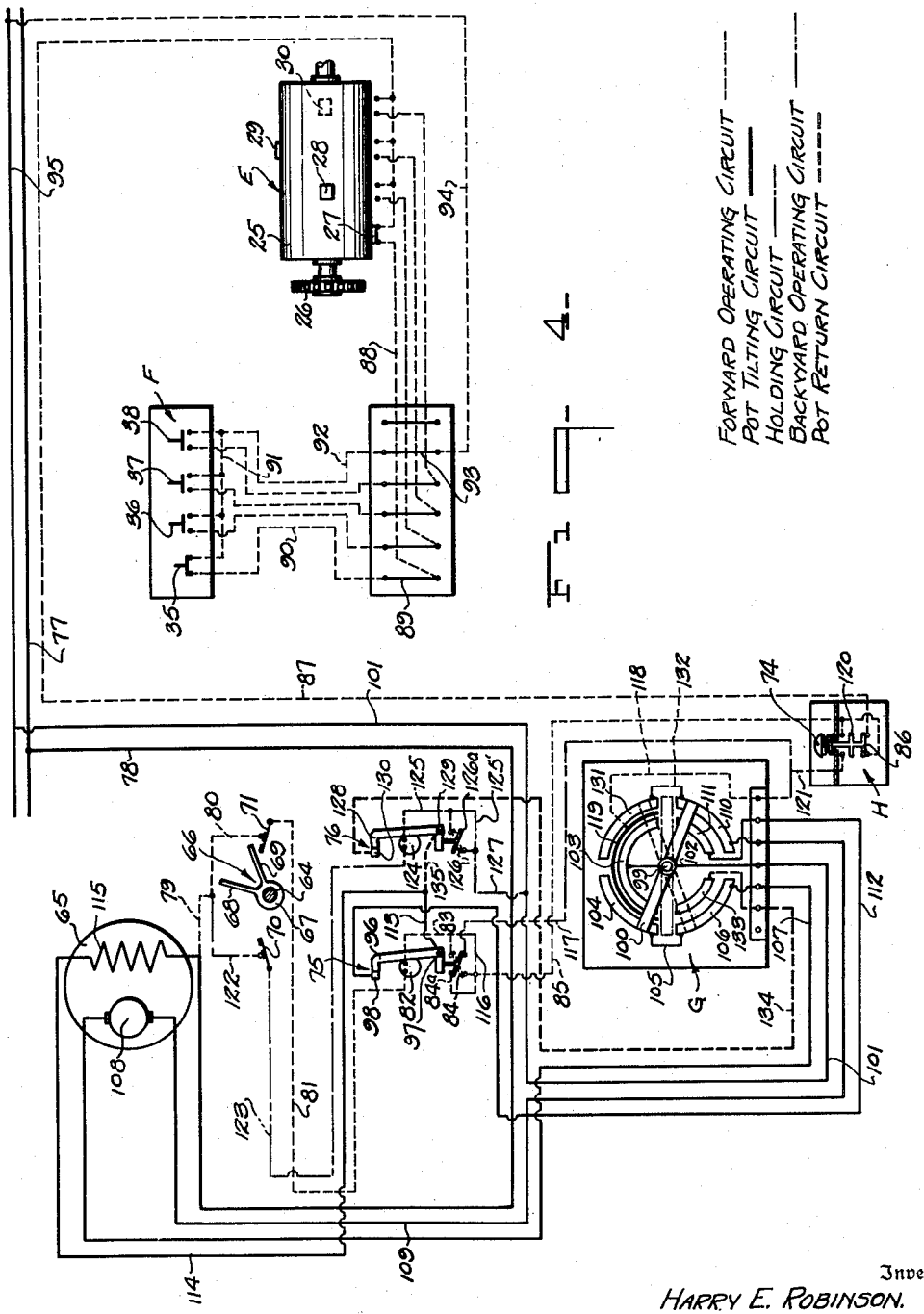

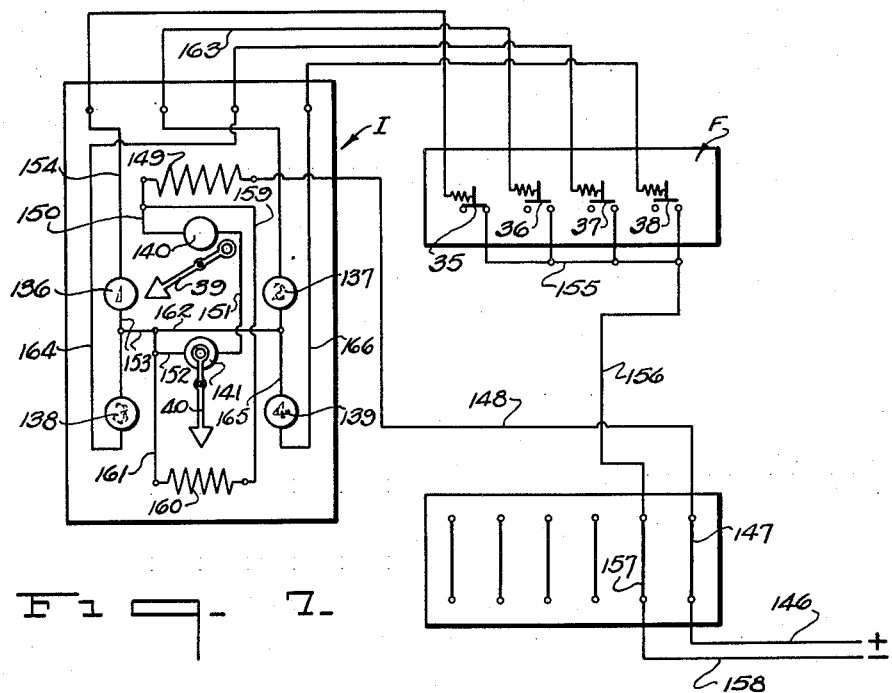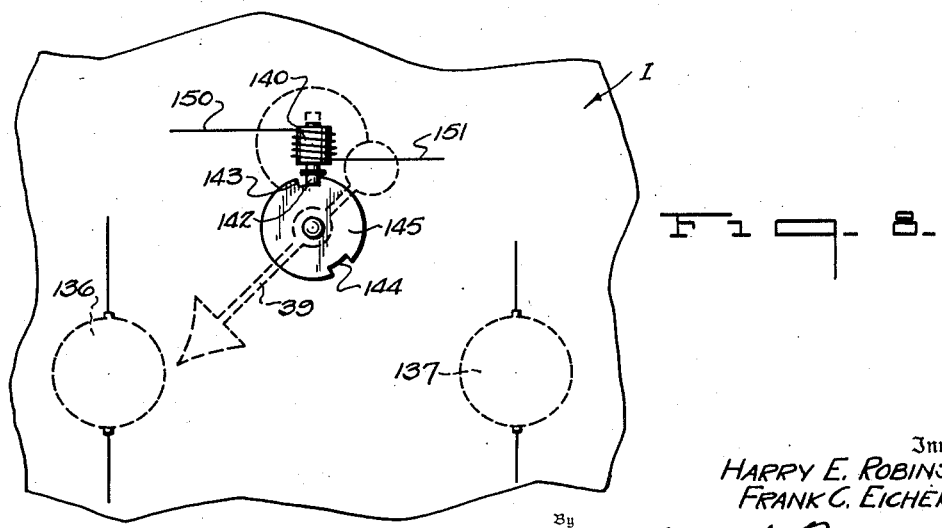

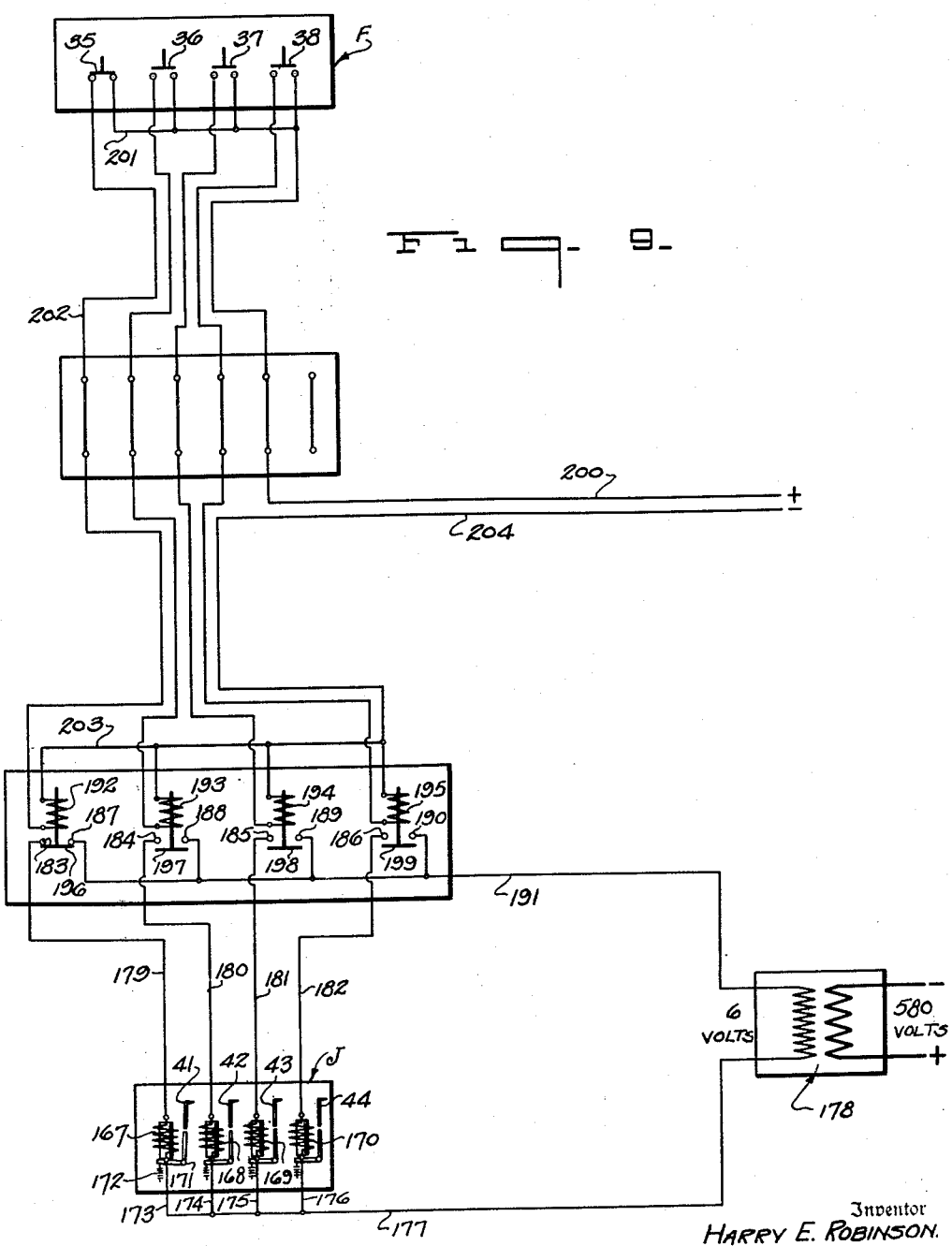

Patented May 25, 1937

2,081,769

UNITED STATES PATENT OFFICE

2,081,769

METHOD AND APPARATUS FOR HANDLING AND EMPTYING GLASS MELTING POTS

Harry E. Robinson and Frank C. Eicher, Toledo, Ohio, assignors to Libbey-Owens-Ford Glass Company, Toledo, Ohio, a corporation of Ohio Application May 4, 1934, Serial No. 723,913

17 Claims. (Cl. 49—39)

The present invention relates broadly to the art of sheet or plate glass manufacture and more particularly to an improved method and apparatus for handling and emptying glass melting pots.

In one well known type of sheet glass making machine, commonly termed the Bicheroux machine, successive charges or pours of molten glass are deposited en masse within a hopper or receiver from which the glass flows between a pair of revolving forming rolls associated therewith, the said rolls being spaced from one another to define a sheet forming pass therebetween, the width of which determines the thickness of sheet produced.

The glass is melted and refined in a series of portable pots within a so-called pot furnace and at regular intervals a pot is removed from the furnace, carried to the machine, and positioned in such relation thereto that upon turning or tipping of the said pot, the molten glass will flow therefrom into the hopper or receiver of the machine and thence between the forming rolls.

With this type of machine, it has been found that when the molten glass is poured from the pot into the rolling machine hopper, wherever the glass contacts initially with the forming rolls, it will cause the said rolls to swell and run out of true. Consequently, if a number of pots of glass are poured into the hopper and caused to initially contact with the forming rolls at the same point or spot upon the peripheries thereof, the said rolls will continue to swell or grow at such points. This deformation of the forming rolls naturally gives cause to unevenness of the glass surfaces and irregularities in the thickness of the glass sheets produced. The Bicheroux machine is primarily adapted for the manufacture of plate glass blanks or, in other words, sheet glass which is to be subsequently ground and polished to produce plate glass. Manifestly, the time required for grinding is dependent, to a large extent, upon the thickness and flatness of the plate glass blank so that the deformation of the forming rolls not only results in a sheet of un-uniform thickness and flatness, but in consequence results in increasing the length of time required for grinding.

An important object of this invention resides in the provision of a novel method and apparatus for handling and emptying the glass melting pots in a manner to overcome the above drawbacks and in so doing reduce to a minimum deformation of the sheet forming rolls and thereby render possible the formation of glass sheets of exceptionally uniform thickness and flatness.

Another important object of the invention is the provision of means affording a positive and accurate control of the tipping of the pots so that the molten glass will be poured therefrom in such a manner that successive charges or pours of glass from succeeding pots will be caused to contact initially with the forming rolls at different or alternate predetermined and selected points or spots around the peripheries thereof.

A further object of the invention is the provision of means under the control of an operator for determining the exact instant at which the pot will begin to tip, together with means for indicating the last point or spot upon the roll peripheries the molten glass was poured, and means for recording the time and spots at which the molten glass was poured over a day's period.

Other objects and advantages of the invention will become more apparent during the course of the following description when taken in connection with the accompanying drawings.

In the drawings wherein like numerals are employed to designate like parts throughout the same, Fig. 1 is a side elevation of one type of sheet glass rolling machine with which the present invention may be incorporated and showing in full lines one of the glass melting pots in position to be emptied, Fig. 2 is a plan view of a portion of the rolling machine showing particularly the driving means for the sheet forming rolls and diagrammatically the revolving timing switch which, when closed, starts the tipping of the pot.

Fig. 3 is a longitudinal vertical section through the sheet glass rolling machine illustrating the pot in substantially fully tipped position, Fig. 4 is a wiring diagram showing the electrical connections between the various operative parts of the apparatus, Fig. 5 is a front view of the annunciator, Fig. 6 is a similar view of the recording clock, Fig. 7 is a diagrammatic view of the annunciator showing the wire connections, Fig. 8 is a detail view of the annunciator showing particularly the holding means for the pointers, and Fig. 9 is a diagrammatic view of the recording clock and the electrical wiring therefor.

Referring now to the drawings, and setting forth briefly the principal units or elements of the present invention, the letter A designates in its entirety the sheet glass rolling machine; B, one of the glass melting pots; C, the overhead traveling crane for carrying and emptying the pot; D, the traveling tables adapted to receive the glass sheet from the rolling machine and carry it to an annealing leer; E, the revolving timing switch which is driven in timed relation to the rotation of the forming rolls; F, the control box carrying a plurality of switches connected in series with the revolving timer switch and adapted to be actuated at will by the machine operator to start, upon closing of the timing switch, the tipping of the pot; G, the tip controller mounted upon the overhead crane and operable by the crane operator for controlling the continued tipping of the pot after it has been started by the machine operator; H, a foot switch also carried by the crane and likewise actuated by the crane operator to give initial control of the tipping of the pot to the machine operator; I, the annunciator for indicating the last point or spot on the roll peripheries the molten glass was poured; and J, the recording clock for recording the time and spots at which the molten glass was poured over a day's period.

The rolling machine A is preferably of the Bicheroux type and, as illustrated in Figs. 1 2, and 3, includes a pair of rotatable sheet forming rolls 10 and 11 having associated therewith a hopper or receiver 12 for receiving therein the charge or pour of molten glass 13 from the pot B upon tipping of the latter. The forming rolls, which are preferably internally cooled by the circulation of water or some other suitable cooling medium therethrough, are spaced from one another to define a sheet forming pass therebetween, the width of which determines the thickness of sheet produced. The molten glass passing from the receiver 12 between the forming rolls is reduced thereby to a sheet 14 of substantially predetermined and uniform thickness, said sheet sliding downwardly from the machine over an inclined chute or runway 15 and being received upon the traveling transporting tables D which carry it to an annealing leer (not shown).

One of the sheet forming rolls, and preferably the lower roll 10, is positively driven from a motor 16 driving, through suitable reduction gearing contained in housing 17, a horizontal shaft 18 mounted at its opposite ends in bearings 19 carried upon a platform or base 20, said shaft having keyed thereto at one end a spur gear 21 meshing with a spur gear 22 fixed to roll 10. The upper sheet forming roll 11 is driven from the lower roll 10 by the intermeshing gears 23 and 24 keyed to the said rolls 10 and 11 respectively. With this arrangement of gearing, it will be readily apparent that the forming rolls rotate in opposite directions, as indicated by the arrows in Fig. 3, to feed the charge of molten glass 13 therebetween from the receiver. Since this type of sheet glass rolling machine is well known in the art, only those portions thereof have been described which are necessary to a complete understanding of the present invention.

The rotatable timing switch E is also carried upon the base 20 and comprises, as best illustrated in Fig. 4, a revolving cylindrical member or drum 25 driven from the shaft 18 in timed relation to the rotation of the forming rolls by means of a chain and sprocket drive or the like 26. The cylindrical member or drum 25 carries or has formed thereupon a plurality and as here shown four contacts 27, 28, 29 and 30 spaced longitudinally along the drum and arranged at substantially equal distances apart circumferentially thereof.

The control box F is preferably secured either directly to a fixed portion of the rolling machine A or mounted closely adjacent thereto so as to be within convenient reach of the machine operator whose duty it is to first see that the pot is properly located for pouring and to then start the tipping thereof. This control box carries four push buttons 31, 32, 33 and 34 (Fig. 5), upon actuation of which the machine operator may effect the closing of switches 35, 36, 37 and 38 (Fig. 4) also arranged within the control box and being connected in series with the contacts 27, 28, 29 and 30 respectively carried by the revolving drum 25.

The annunciator I is associated with preferably positioned directly beneath the control box F and is adapted to indicate, upon pressing of any one of the buttons 31, 32, 33, or 34 by the operator, the number of the button pushed and in consequence the point or spot upon the forming rolls at which the molten glass is adapted to initially contact. The numerals (1), (2), (3), and (4), appearing upon the face of the annunciator in Fig. 5, correspond to the four contacts 27, 28, 29 and 30 respectively on the revolving drum 25 and designate the four spots or points upon the roll peripheries upon which the molten glass is adapted to be poured.

The annunciator includes two pointers 39 and 40, the pointer 39 being connected in series with switches 35 and 36 and adapted to point to either (1) or (2) upon pushing of button 31 or 32, while the pointer 40 is connected in series with switches 37 and 38 and movable to point to (3) or (4) upon pushing of button 33 or 34. Consequently, upon pressing of any one of the buttons 31, 32, 33 or 34, the respective switch 35, 36, 37 or 38 will be closed to effect the closing of a circuit through the corresponding contact 27, 28, 29 or 30 on drum 25 when the said drum reaches a predetermined position in its rotation, and the pot tipped to pour the molten glass upon the spot on the forming rolls corresponding to the switch which was closed. At the same time, the pointer 39 or 40 will be moved to indicate the last spot upon the rolls the molten glass was poured. For instance, upon pressing of button 31 to close switch 35, the pointer 39 will be moved to point to the numeral (1) as shown in Fig. 5. The particular construction and operation of the annunciator will be hereinafter described more in detail.

Simultaneously with the operation of the annunciator, the recording clock J will be actuated, through suitable wire connections, to indicate and make a permanent record of the time and buttons pushed and in consequence the points or spots on the roll peripheries upon which the molten glass has been poured. The recording clock may be of any well known or preferred construction and, as here shown, includes four pens or other marking elements 41, 42, 43 and 44 connected in series with the switches 35, 36, 37 and 38 respectively and actuated upon the closing thereof. This clock preferably comprises a rotatable face (Fig. 6) covered with suitably marked graph paper 45 and upon which the pens indicate graphically, by the marks 46, the time and spots at which the molten glass was poured over a day's period.

The overhead crane C (Fig. 1) may also be of any preferred construction but, as here shown, includes a horizotnal supporting framework 47 mounted upon wheels 48 which run along the spaced horizontal rails 49 extending transversely above the rolling machine A. Mounted upon the framework 47 is a carriage 50 carried by wheels 51 and movable upon the said framework in a direction at substantially right angles to the movement of the latter upon rails 49. Arranged at each side of the carriage 50 and mounted for vertical sliding movement between spaced guide members 51' and 52 is a vertically disposed supporting beam 53, said beam having secured upon its outer side a vertical rack bar 54 with which meshes a gear 55 fixed to shaft 56 driven from a motor 57 so that upon operation of the said motor to rotate gear 55, the rack bar 54 and supporting beam 53 will be moved vertically.

Carried at the lower end of each supporting beam 53 is a bearing 58 and extending between and journaled in the bearings on the two supporting beams is a horizontal shaft 59. Secured to this shaft is a pair of pot gripping tongs 60 which are adapted to engage and support the pot B. Upon rotation of the shaft 59, the pot held in the tongs will be turned or tilted around a horizontal axis located in or near the pouring edge of the said pot and during this tipping of the pot, the molten glass 13 will flow therefrom into the receiver 12 of the rolling machine. The shaft 59 is rotated first in a counter-clockwise direction to bring the pot to the position indicated in broken lines at B' in Fig. 1 and then rotated in a clockwise direction to return the pot to a horizontal position as shown by the full lines in the same figure.

The rotation of the shaft 59 may be accomplished through the medium of a sprocket chain or the like 61 trained about a sprocket 62 on shaft 59 and also about a sprocket 63 keyed to a horizontal shaft 64 journaled in suitable bearings carried by the supporting beams 53 and driven from a series-wound motor 65. Also keyed to the shaft 64 is a knock-out element 66 (Figs. 1 and 4) comprising a hub 67 having formed thereupon two diverging fingers 68 and 69 which are adapted to effect the opening of the limit switches 70 and 71 respectively suitably carried by the crane. Thus, upon rotation of the shaft 64 in a counter-clockwise direction, the shaft 59, turning in the same direction, will cause the tipping or tilting of the pot B, and when the pot reaches its fully tipped position, the finger 68, engaging limit switch 70, will open the latter to break the circuit through motor 65 whereby to arrest the forward tilting movement of the pot. On the other hand, when the shaft 64 is turned in the opposite direction, the shaft 59, turning in the same direction, will cause the return of the pot to a horizontal position, and when the pot reaches its starting position, the finger 69 will engage and open limit switch 71 to bring motor 65 to a stop. By the provision of the two limit switches 70 and 71, therefore, the pot will be prevented from being moved too far in either direction.

The crane C is provided with the customary operator's cab 72, within which the operator is stationed, and mounted within this cab is the tip controller G and foot switch H. The tip controller G, by means of which the crane operator controls the continued tipping of the pot after it has been initially started by the machine operator, includes a lever 73 which, when moved to one position, actuates the controller to effect operation of the motor 65 in one direction to tilt the pot, and when moved to a second position actuates the controller to effect rotation of the said motor in the opposite direction to return the pot to horizontal position.

The foot switch H which, upon actuation by the crane operator, is adapted to give initial control of the tipping of the pot to the machine operator, includes a foot pedal 74 which is depressed by the crane operator to temporarily open the switch after the pot has been properly positioned for pouring.

Before entering into a detailed description of the electrical wiring of the various parts of the apparatus, it is believed that a brief description at this point of the general operation of the invention will be helpful. Thus, the pot B of molten glass is first brought to the rolling machine A and properly located for pouring, at which time the said pot will be in the full line position shown in Fig. 1. The crane operator then depresses the foot pedal 74 and moves the lever 73 of controller G into position for tipping the pot. However, the pot will not begin to tip because when the crane operator pressed the foot pedal 74 downwardly, the foot switch H was opened to break the circuit through the controller G. In other words, upon depressing the foot pedal 74, the crane operator cuts out his control of the pot and transfers the initial tipping thereof to the machine operator who is in charge of locating the pot at the machine.

When the machine operator has decided that the pot is properly located for pouring, he presses the desired button 31, 32, 33 or 34 to close the respective switch 35, 36, 37 or 38, depending upon the spot on the roll peripheries it is desired to pour the glass. When the drum 25 of timer switch E then reaches a predetermined position in its rotation, a circuit is completed through the corresponding contact 27, 28, 29 or 30 to complete the circuit through the motor 65 and cause the pot to tip. As soon as the pot starts to tip, the crane operator removes his foot from the foot pedal 74 which causes the closing of foot switch H and completes the circuit through the controller G so that the crane operator can then use the lever 73 to control the continued tipping of the pot.

When the pot has been emptied, the knock-out finger 68, engaging limit switch 70, will effect the opening of the latter, thereby breaking the circuit through the motor 65 to arrest the forward movement of the pot. After the pot has been emptied, the crane operator moves the lever 73 into a second position to again complete the circuit through the controller G and motor 65, causing the motor to be driven in the opposite direction and thereby effecting the return of the pot to horizontal position. When the pot reaches its original position, the finger 69 of knock-out element 66, engaging limit switch 71, will cause the opening thereof, thereby again breaking the circuit through motor 65 and stopping the backward movement of the pot.

The electrical connections between the various parts of the present invention, rendering their operation in the manner above described, comprise, in effect, six different circuits for effecting the desired forward and backward movements of the glass melting pot in addition to an annunciator circuit and a recording clock circuit. The pot actuating circuits are not of course separate and distinct from one another but instead overlap, with certain connections or wires forming a part of two or more of the circuits. A composite diagram of the several pot actuating circuits is illustrated in Fig. 4 and, briefly stated, these circuits may be classified as follows:

(1) The "forward operating circuit" which effects the closing of the switch 75 (Fig. 4) in the pot tilting circuit to complete this latter circuit;

(2) The "pot tilting circuit" which energizes the motor 65 to effect forward tipping of the pot;

(3) The "holding circuit" which maintains the switch 75 in the pot tilting circuit closed upon release of the foot pedal 74 by the crane operator;

(4) The "auxiliary operating circuit" which effects automatic closing of the switch 75 in the pot tilting circuit upon operation of the controller to close this circuit during the tilting of the pot;

(5) The "backward operating circuit" which maintains the switch 76 (Fig. 4) in the pot return circuit closed to complete this circuit;

(6) The "pot return circuit" which energizes motor 65 to effect the return of the pot to its horizontal starting position.

Forward operating circuit

After the pot B has been properly positioned for pouring relative to the rolling machine A, the crane operator, as pointed out above, sets the lever 73 for tipping the pot and puts his foot on foot pedal 74. The machine operator then pushes the desired button 31, 32, 33 or 34 to close the respective switch 35, 36, 37 or 38. As the revolving drum 25 rotates and the contact 27, 28, 29 or 30 which corresponds to the switch which has been previously closed reaches a predetermined position, the forward operating circuit will be completed to close the above mentioned switch 75 which will, in turn, effect the completion of the pot tilting circuit to start tipping of the pot.

For instance, assuming the button 31 is pushed to close switch 35, the electric current in main line 77, entering wire 78, will pass through wires 79 and 80, limit switch 71, and wire 81 to the electro-magnet 82; from the electro-magnet through wire 83, contact plate 84, wire 85, switch plate 86 in foot switch H, wire 87, contact 27 on revolving drum 25, wires 88, 89 and 90 to switch 35 and from this switch through wires 91, 92, 93 and 94 to main line 95. The completion of this circuit through the electro-magnet 82 effects the energization thereof so that it acts to draw the movable contact arm 96 pivoted at one end as at 97 over and into engagement with stationary contact 98 to close switch 75. When this is done, the contact plate 84 will be automatically moved from the position indicated in broken lines to the position indicated in full lines and designated 84ᵃ.

Upon engagement of the contacts 96 and 98 to close switch 75, the pot tilting circuit through the controller G and motor 65 will be completed and, upon operation of the said motor, the pot will begin to tip as described above. As the pot starts to tip, the crane operator removes his foot from the foot pedal 74 and controls the continued tipping of the pot by proper manipulation of the lever 73. In other words, upon closing of the switch 35 by the machine operator and the completion of the circuit through the contact 27 on drum 25 to energize the electro-magnet 82 and, in so doing, effect the closing of switch 75, the control of the tipping of the pot is automatically given to the crane operator.

Pot tilting circuit

The lever 73 of the tip controller G is keyed to a horizontal shaft 99 (Fig. 4) which carries a control arm 100 movable to assume three different positions, namely, a neutral position as indicated by the dot and dash lines; a forward operating position as indicated by the full line, and a reverse operating position as indicated by the dotted lines. As pointed out above, when the machine operator closes switch 35, the crane operator has his foot on the foot pedal 74 and has already thrown the lever 73 to forward operating position which will move the control arm 100 to the position shown in full lines. It is of course essential that the lever be moved to forward operating position before the machine operator closes switch 35 since, if this is not done, the completion of the forward operating circuit will not complete the pot tilting circuit.

The pot tilting circuit includes the main line 95, from which the current passes through wires 101 and 102 to the arcuate conducting strip 103 of the controller G; from this conducting strip through control arm 100 to the arcuate conducting strip 104, and thence through wire 105 to arcuate conducting strip 106; from which it flows through wire 107 to the armature 108 of motor 65, and thence through wire 109 to arcuate conducting strip 110, from which it again passes through control arm 100 to arcuate conducting strip 111; through wire 112, contacts 98 and 96, wires 113 and 114 to the field 115 of motor 65, and then out through wire 78 to main line 77.

Holding circuit

This circuit operates to maintain the electro-magnet 82 energized upon the release of foot pedal 74 by the crane operator which, as explained above, he is supposed to do just as soon as the pot begins to tip. Were it not for this holding circuit, the electro-magnet 82 would be de-energized upon the release of the foot pedal, thereby breaking the pot tilting circuit through the motor 65 and stopping the tipping of the pot. The holding circuit may be traced from the main line 77 through wires 78, 79 and 80, limit switch 71, wire 81, electro-magnet 82, wires 83 and 116, contact plate 84, wires 117 and 118 to the arcuate conducting strip 119 of controller G; from which it passes through control arm 100 to arcuate conducting strip 103, and out through wires 102 and 101 to main line 95.

Auxiliary operating circuit

After the tipping of the pot has been started by the machine operator, the auxiliary operating circuit operates to automatically energize the electro-magnet 82 each time the control arm 100 may be moved by the crane operator from its neutral position to its forward position whereby to close the switch 75 and complete the circuit through the motor 65. This permits the crane operator to work the control lever 73 back and forth to effect the tipping of the pot in a step by step fashion or by a series of intermittent movements if desired. In order to do this, the control arm 100 of controller G is caused to move back and forth from neutral position to its forward operating position and of course each time it is moved into neutral position, the electro-magnet 82 is de-energized and the contact arm 96 moved away from stationary contact 98 to open switch 75. Consequently, some means must be provided to again energize the electro-magnet 82 to close switch 75 each time the control arm is moved to its forward operating position. This is accomplished by the auxiliary operating circuit which comprises the wire 78 leading from main line 77, wires 79 and 80, limit switch 71, wire 81, electro-magnet 82, wire 83, contact plate 84, wire 85 to and through switch plate 120 in foot switch H; wires 121 and 118 to arcuate conducting strip 119 through control arm 100 to arcuate conducting strip 103 and out through wires 102 and 101 to main line 95.

Backward operating circuit

After the pot has been emptied and it is desired to return the same to horizontal position, the crane operator throws the control lever 73 to move the control arm 100 of the controller G into reverse operating position as indicated by the dotted lines in Fig. 4. This circuit includes the main line 77 and wires 78 and 79, through which the current passes to wire 122, limit switch 70 and wire 123 to electro-magnet 124; from the electro-magnet through wire 125, contact plate 126, wire 127, and out wire 101 to main line 95. Upon completion of this circuit to energize the electro-magnet 124, the movable contact arm 128, pivoted at 129, will be drawn over and into engagement with the stationary contact 130 to close switch 76. The electro-magnet 124 is energized at all times and acts to maintain the switch 76 closed. Inasmuch as the backward operating circuit is alive at all times, the simple throwing of the control lever 73 into reverse position by the crane operator will start the motor 65 operating to lower the pot to horizontal position. Upon closing of switch 76, the contact plate 126 will be caused to assume the position shown in full lines in Fig. 4 and designated 126a. When this is done, the current, instead of passing through contact plate 126, passes from wire 125 through wire 125' to wire 127 and out through wire 101 to main line 95.

Pot return circuit

In returning the pot to starting position, the current passes from main line 95, through wires 101 and 102 to the arcuate conducting strip 103 of controller G; from which it passes through control arm 100 to the arcuate conducting strip 131, and thence through wire 132 to conducting strip 110, wire 109, to the armature 108 of motor 65; from the motor through wire 107 to conducting strip 106, and thence through control arm 100 to arcuate conducting strip 133, wire 134, contacts 130 and 128, wires 135 and 114 to the field 115 of motor 65, and out through wire 78 to main line 77. When the pot has been returned to horizontal position, its movement can be arrested by the crane operator by simply moving the control lever 73 to neutral position. However, the circuit through the motor 65 will be broken and the movement of the pot automatically stopped upon opening of the limit switch 70 by the knock-out finger 68. Likewise, as pointed out above, the forward tipping movement of the pot will be automatically stopped at the proper time by the opening of limit switch 71 by knock-out finger 69. The return of the pot to horizontal position is controlled entirely by the crane operator. In fact, all the machine operator does is to locate the pot with respect to the machine and start the tipping thereof. From then on, the control of the pot is in the hands of the crane operator.

Annunciator

The construction and operation of the annunciator I is illustrated in Figs. 5, 7 and 8 so that particular attention is now directed to these three figures. As brought out above, the annunciator is provided to indicate the last point or spot on the roll peripheries the molten glass was poured so that the machine operator will always know which of the buttons 31, 32, 33 or 34 was pushed last. Also, as set forth above, the annunciator includes two pointers 39 and 40, the pointer 39 being connected in series with switches 35 and 36 and adapted to be swung to point in the direction of either (1) or (2) upon pushing of button 31 or 32, while the pointer 40 is connected in series with switches 37 and 38 and movable to point toward (3) or (4) upon pushing of button 33 or 34.

The actuation of the pointers 39 and 40 is effected by the provision of electro-magnets which are adapted to swing the said pointers about their pivots to the desired indicating position. To this end, electro-magnets 136 and 137 are associated with and disposed at opposite sides of pointer 39 and are adapted, upon energization thereof, to move the said pointer to point toward either (1) or (2), while associated and arranged at opposite sides of pointer 40 are electro-magnets 138 and 139 which, when energized, effect movement of the said pointer to point to either (3) or (4). In other words, the four electro-magnets 136, 137, 138 and 139 correspond to the four numerals (1), (2), (3) and (4) respectively which in turn designate the four points or spots upon the roll peripheries the molten glass is adapted to be poured. The pointers 39 and 40 are also maintained in indicating position until the next button is pushed, by means of solenoids 140 and 141 respectively.

As shown particularly in Fig. 8, each solenoid 140 and 141 includes a vertically movable plunger 142 which is adapted to be received within notches 143 and 144 formed in a disc 145 carried by the respective pointer. For instance, when pointer 39 is swung to point to numeral (1), the plunger 142 of solenoid 140 is received within notch 143 whereby to maintain the pointer in such position whereas when the said pointer is moved to point to numeral (2), the plunger will be received within notch 144; the pointer being maintained in each position until the solenoid is energized to draw the plunger upwardly out of engagement with disc 145. The pointer 40 is caused to operate in the same manner.

In the operation of the annunciator, and assuming that the button 31 is pushed by the machine operator to close switch 35, the current entering line 146 will pass through wires 147 and 148, resistance 149, and wire 150 to solenoid 140, and thence through wire 151 to solenoid 141, through wires 152 and 153 to electro-magnet 136, through wire 154, switch 35 and wires 155, 156 and 157 to line 158. Upon completion of this circuit, the solenoids 140 and 141 will both be energized to lift the plungers 142 thereof upwardly and at the same time the electro-magnet 136 will also be energized to swing the pointer 30 to the left so that it will point in the direction of numeral (1). The solenoids 140 and 141 and electro-magnet 136 operate substantially simultaneously and since the switch 35 is only temporarily closed, when it is opened both solenoids and likewise the electro-magnet will be deenergized. When this occurs, the plungers 142 of the solenoids drop downwardly and the plunger of solenoid 140 will be received within notch 143 in disc 145 carried by pointer 39, thereby maintaining this pointer in indicating position until the said solenoid is again energized. The current passing through resistance 149 will be split and a portion thereof shunted through wire 159, resistance 160, and wire 161 to wire 153. It will of course be appreciated that the lines 146 and 158 lead from or are suitably connected to the main lines 77 and 95 shown in Fig. 4.

When the next pot of molten glass is brought to the machine for pouring, the machine operator will press button 32 to close switch 36, at which time the electric current, instead of passing through wire 153 to electro-magnet 136, will pass through wire 162, electro-magnet 137 and wire 163 to the switch 36 and thence to line 158. When this circuit is completed and the coil of the solenoid 140 energized to lift the plunger 142 thereof, the pointer 39 will be released and permitted to drop downwardly. At the same time, however, the energization of the electro-magnet 137 will swing the pointer to the right to point to numeral (2) and the plunger will then be received within notch 144 in disc 145 to maintain the said pointer in this position.

When the operator presses button 33 to close switch 37, the current, instead of passing through wire 153 to electro-magnet 136, will pass through electro-magnet 138 and wire 164 to switch 37 and thence to line 158. The solenoids 140 and 141, as well as the electro-magnet 138, are thereby energized, the energization of the electro-magnet 138 drawing pointer 140 over to point to numeral (3), while at the same time the pointer 39 will be released and permitted to drop into vertical position. Upon pressing of button 34 to close switch 38, the current instead of passing through wire 153 to electro-magnet 138, will pass through wires 162 and 165 to electro-magnet 139 and thence through wire 166 to switch 38 and to line 158. When this is done, the energization of solenoid 141 will release the pointer 40, permitting it to drop downwardly, while, at the same time, the energization of electro-magnet 139 will cause the pointer to swing to the right to point to numeral (4).

The resistance 149 is provided to cut down the current passing therethrough from 115 volts to approximately 18 volts, while the resistance 160 is incorporated in the circuit to slow up the current slightly to permit the pointers 39 and 40 to be released before the electro-magnets 136, 137, 138 and 139 are energized. This is desirable in order to permit the plungers 142 of solenoids 140 and 141 to be moved out of engagement with the said pointers slightly in advance of the pointers being swung by the electro-magnets to indicating position.

*Recording clock*

The recording clock J, utilized to indicate and make a permanent record of the time and points or spots on the peripheries of the forming rolls upon which the molten glass is poured over a day's period, includes the four pens or other suitable marking elements 41, 42, 43 and 44 electrically connected with the switches 35, 36, 37 and 38 respectively so that upon closing of these switches by the machine operator, effected by the pushing of the buttons 31, 32, 33 and 34, the corresponding pen will be actuated to make a mark 46 on the face 45 of the said clock. For instance, if the machine operator pushes button 31 to close switch 35, the pointer 39 of the annunciator will be moved to point to the numeral (1) and simultaneously the pen 41 will be actuated to make a permanent record of the operation.

The means for actuating the pens 41, 42, 43 and 44 is illustrated in Fig. 9 and includes two electrical circuits, namely, an actuating circuit and a closing circuit for completing the actuating circuit. The actuating circuit includes the four electro-magnets 167, 168, 169 and 170 associated with and adapted to control the movement of the four pens 41, 42, 43 and 44 respectively. Each pen consists of a substantially L-shaped lever pivoted at 171 and adapted to be moved about said pivot upon energization of the respective electro-magnet. A spring 172 is also associated with each pen to return the said pen to normal position upon de-energization of the said electro-magnet.

Leading from one side of the electro-magnets 167, 168, 169 and 170 are wires 173, 174, 175 and 176 respectively connected to a common wire 177 running to a step-down transformer 178. Connected to the opposite side of the electro-magnets are wires 179, 180, 181 and 182 which are connected at their outer ends to contacts 183, 184, 185 and 186 respectively, which contacts cooperate with contacts 187, 188, 189 and 190 connected to a common wire 191 also leading to transformer 178.

The closing circuit includes four solenoids 192, 193, 194 and 195, the plungers of which carry contact plates 196, 197, 198 and 199 respectively which are adapted to engage the pairs of contacts 183—187, 184—188, 185—189, and 186—190 respectively to complete the circuit through the electro-magnets 167, 168, 169, and 170 whereby to actuate the marking pens 41, 42, 43 and 44. Thus, assuming button 31 is pushed by the machine operator to close switch 35, the current entering line 200 will pass through wire 201, switch 35, wire 202, solenoid 192 and wire 203 to line 204. The completion of this circuit will effect the energizing of the solenoid 192 to raise the contact plate 196 thereof into engagement with contacts 183 and 187, thereby completing the actuating circuit, whereupon the current entering through transformer 178 passes through wire 191, contact plate 196, wire 179, through the electro-magnet 167 and out through wires 173 and 177. The energization of the electro-magnet 167 will cause the pen 41 to be rocked about its pivot 171 to make an indicating mark 46 on the face of the recording clock.

The switch 35 is of course only temporarily closed and as soon as it is opened, the circuit through the solenoid 192 will be broken and the same de-energized, thereby permitting the contact plate 196 to move out of engagement with contacts 183 and 187, causing the breaking of the actuating circuit and the de-energizing of electro-magnet 167. The spring 172 will then act to automatically rock the pen in the opposite direction to return it to initial position. The pens 42, 43 and 44 are actuated in the same manner upon closing of switches 36, 37 and 38, these switches completing circuits through solenoids 193, 194 and 195 respectively so as to in turn complete the actuating circuit through the corresponding electro-magnet 168, 169 and 170 to actuate the respective pen. The lines 200 and 204 also lead from or are suitably connected to the main lines 77 and 95 shown in Fig. 4.

From the above, it will be seen that there has been provided a process and apparatus for automatically causing the pot to start tipping at the proper instant or, in other words, when a substantially predetermined portion of the peripheries of the forming rolls reaches a predetermined position in their rotation to the end that the molten glass flowing from the pot will contact initially with the said rolls at a substantially predetermined and selected point or spot upon the peripheries thereof. By causing successive charges or pours of molten glass from succeeding pots to contact initially with the forming rolls at different or alternate points or spots around the peripheries thereof, deformation of the said rolls will be reduced to a minimum, resulting in the production of a sheet of glass of exceptionally uniform thickness and flatness.

The invention disclosed hereinabove has not only been reduced to actual practice, but is now in commercial use and it has been found that by the practice of the above described process and with the use of the apparatus disclosed, deformation of the forming rolls is reduced to a minimum, resulting in a much flatter sheet of glass and a material lessening of the time required for the proper grinding thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and effecting the discharge of the molten glass from said pot, and means under the control of an operator and operatively connected with the forming rolls and pot supporting means for automatically causing the pot to start tipping when a substantially predetermined and selected portion of the forming roll peripheries reaches a predetermined position in their rotation.

2. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and effecting the discharge of the molten glass from said pot, and an electrical timing mechanism under the control of an operator and operatively connected with the forming rolls and pot supporting means for automatically causing the pot to start tipping when a substantially predetermined and selected portion of the forming roll peripheries reaches a predetermined position in their rotation.

3. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and effecting the discharge of the molten glass from said pot embodying an electrical timing mechanism including a motor for tipping the pot, a revolving switch, means for rotating said switch in timed relation to the rotation of the forming rolls, and means for completing a circuit through said switch when it reaches a predetermined position in its rotation to automatically set the motor in operation and start the tipping of the said pot.

4. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and effecting the discharge of the molten glass from said pot embodying an electrical timing mechanism including a motor for tipping the pot, a revolving switch, means for rotating said switch in timed relation to the rotation of the forming rolls, means for completing a circuit through said switch when it reaches a predetermined position in its rotation to automatically set the motor in operation and start the tipping of the said pot, and separate means in series with said motor for controlling the continued tipping of the pot after the circuit through the revolving switch is broken.

5. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and effecting the discharge of the molten glass from said pot embodying an electrical timing mechanism including a motor for tipping the pot, a revolving switch, means for rotating said switch in timed relation to the rotation of the forming rolls, means for completing a circuit through said switches when it reaches a predetermined position in its rotation to automatically set the motor in operation and start the tipping of the said pot, separate means in series with said motor for controlling the continued tipping of the pot after the circuit through the revolving switch is broken, and means for rendering said last-mentioned means ineffective until after the circuit through said revolving switch has been broken and the pot has commenced to tip.

6. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and effecting the discharge of the molten glass from said pot embodying an electrical timing mechanism including a motor for tipping the pot, a revolving switch, means for rotating said switch in timed relation to the rotation of the forming rolls, and a second switch under the control of an operator and adapted, when closed, to complete a circuit through said revolving switch when the last-named switch reaches a predetermined position in its rotation to effect the energization of said motor and automatically start the tipping of said pot.

7. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and effecting the discharge of the molten glass from said pot embodying an electrical timing mechanism including a motor for tipping the pot, a revolving switch, means for rotating said switch in timed relation to the rotation of the forming rolls, a second switch under the control of an operator and adapted, when closed, to complete a circuit through said revolving switch when the last-named switch reaches a predetermined position in its rotation to effect the energization of said motor and automatically start the tipping of said pot, and a manually operable controller in series with said motor and adapted, when moved to one position, to control the continued tipping of the pot after the circuit through the revolving switch is broken, and when moved to another position to control the return of the said pot to starting position.

8. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and effecting the discharge of the molten glass from said pot embodying an electrical timing mechanism including a motor for tipping the pot, a revolving switch, means for rotating said switch in timed relation to the rotation of the forming rolls, a second switch under the control of an operator and adapted, when closed, to complete a circuit through said revolving switch when the last-named switch reaches a predetermined position in its rotation to effect the energization of said motor and automatically start the tipping of said pot, a manually operable controller in series with said motor and adapted, when moved to one position, to control the continued tipping of the pot after the circuit through the revolving switch is broken, and when moved to another position to control the return of the said pot to starting position, and means also under the control of an operator for rendering the controller ineffective for controlling the continued tipping of the pot until after the circuit through said revolving switch has been broken and the said pot has commenced to tip.

9. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and effecting the discharge of the molten glass from said pot embodying an electrical timing mechanism including a motor for tipping the pot, a revolving switch, means for rotating said switch in timed relation to the rotation of the forming rolls, means under the control of an operator for completing a circuit through the revolving switch when it reaches a predetermined position in its rotation to effect the completion of a circuit through said motor to automatically start the tipping of said pot, means in series with said motor and under the control of a second operator for controlling the continued tipping of the pot after the circuit through the said revolving switch is broken, and means also under the control of said second operator for giving initial control of the tipping of the pot to the first operator and rendering the means for controlling the continued tipping of the pot ineffective until after the circuit through the revolving switch has been broken and the pot has commenced to tip.

10. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and effecting the discharge of the molten glass from said pot embodying an electrical timing mechanism including a motor for tipping the pot, a timer switch comprising a rotatable drum having a plurality of contacts thereon spaced longitudinally of the drum and located at substantially equal distances around the periphery thereof, each of said contacts corresponding to a predetermined point or spot upon the peripheries of the forming rolls, means for rotating said drum in timed relation to the rotation of the forming rolls, a plurality of switches under the control of an operator, one being provided for and connected in series with the respective contact and adapted, when closed, to effect the completion of a circuit through the corresponding contact when the said drum reaches a predetermined position in its rotation to set the motor in operation and start tipping of the pot.

11. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and effecting the discharge of the molten glass from said pot embodying an electrical timing mechanism including a motor for tipping the pot, a timer switch comprising a rotatable drum having a plurality of contacts thereon spaced longitudinally of the drum and located at substantially equal distances around the periphery thereof, each of said contacts corresponding to a predetermined point or spot upon the peripheries of the forming rolls, means for rotating said drum in timed relation to the rotation of the forming rolls, a plurality of switches under the control of an operator, one being provided for and connected in series with the respective contact and adapted, when closed, to effect the completion of a circuit through the corresponding contact when the said drum reaches a predetermined position in its rotation to set the motor in operation and start tipping of the pot, and means for indicating the particular switch closed.

12. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and effecting the discharge of the molten glass from said pot embodying an electrical timing mechanism including a motor for tipping the pot, a timer switch comprising a rotatable drum having a plurality of contacts thereon spaced longitudinally of the drum and located at substantially equal distances around the periphery thereof, each of said contacts corresponding to a predetermined point or spot upon the peripheries of the forming rolls, means for rotating said drum in timed relation to the rotation of the forming rolls, a plurality of switches under the control of an operator, one being provided for and connected in series with the respective contact and adapted, when closed, to effect the completion of a circuit through the corresponding contact when the said drum reaches a predetermined position in its rotation to set the motor in operation and start tipping of the pot, means for indicating the particular switch closed, and means for making a permanent record of the closing of said switch.

13. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and effecting the discharge of the molten glass from said pot embodying an electrical timing mechanism including a motor for tipping the pot, a timer switch comprising a rotatable drum having a plurality of contacts thereon spaced longitudinally of the drum and located at substantially equal distances around the periphery thereof, each of said contacts corresponding to a predetermined point or spot upon the peripheries of the forming rolls, means for rotating said drum in timed relation to the rotation of the forming rolls, a plurality of switches under the control of an operator, one being provided for and connected in series with one of said contacts and adapted, when closed, to effect the completion of a circuit through the corresponding contact when the said drum reaches a predetermined position in its rotation to set the motor in operation and start tipping of the pot, and manually controlled means in series with said motor for effecting the continued tipping of the pot and also the return thereof to starting position after the circuit through the timer switch has been broken and the said pot commenced to tip.

14. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and effecting the flowing of the molten glass from said pot embodying means actuated by movement of the forming rolls for causing the tipping of the pot so that the molten glass flowing therefrom will be caused to contact initially with the forming rolls at a substantially predetermined and selected point upon the peripheries thereof.

15. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and effecting the flowing of the molten glass from said pot embodying electrically operated means actuated by movement of the forming rolls when said rolls reach a predetermined position in their rotation for causing the tipping of the pot so that the molten glass flowing therefrom will be caused to contact initially with the forming rolls at a substantially predetermined and selected point upon the peripheries thereof.

16. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and tipping the pot to flow the molten glass therefrom, and means connecting said forming rolls and pot supporting means for causing the tipping of the pot when a substantially predetermined and selected portion of the forming roll peripheries reaches a predetermined position in their rotation.

17. The combination with a sheet glass rolling machine including a pair of horizontal driven forming rolls spaced from one another to create a sheet forming pass therebetween, means associated with said forming rolls and adapted to receive a charge of molten glass therein and from which the said glass passes between the forming rolls and is reduced thereby to sheet form, and a portable pot containing a charge of molten glass to be deposited in said last-mentioned means, of means for supporting and effecting the discharge of the molten glass from said pot embodying an electrical timing mechanism including a motor for tipping the pot, a switch, and means actuated by the forming rolls when they reach a predetermined position in their rotation for completing a circuit through said switch to automatically set the motor in operation and start the tipping of said pot.

HARRY E. ROBINSON.
FRANK C. EICHER.